US009170608B2

(12) United States Patent
Horii (10) Patent No.: US 9,170,608 B2
(45) Date of Patent: Oct. 27, 2015

(54) APPARATUS FOR ELECTRICALLY CONNECTING TO A PORTABLE ELECTRONIC DEVICE

(75) Inventor: Hiroshi Horii, Pacifica, CA (US)

(73) Assignee: Nokia Technologies Oy, Espoo (FI)

( * ) Notice: Subject to any disclaimer, the term of this patent is extended or adjusted under 35 U.S.C. 154(b) by 999 days.

(21) Appl. No.: 13/278,690

(22) Filed: Oct. 21, 2011

(65) Prior Publication Data

US 2013/0100605 A1    Apr. 25, 2013

(51) Int. Cl.
*G06F 1/16* (2006.01)

(52) U.S. Cl.
CPC ............ *G06F 1/1632* (2013.01); *G06F 1/1626* (2013.01)

(58) Field of Classification Search
CPC ............................. G06F 1/1626; G06F 1/1632
USPC ............................ 361/679.56, 679.41–679.44
See application file for complete search history.

(56) References Cited

U.S. PATENT DOCUMENTS

| 5,187,645 A * | 2/1993 | Spalding et al. ......... 361/679.41 |
| 6,135,801 A * | 10/2000 | Helot et al. .................. 439/341 |
| 2009/0295328 A1 | 12/2009 | Griffin, Jr. ..................... 320/115 |

FOREIGN PATENT DOCUMENTS

| CN | 201878217 U | 6/2011 |
| WO | WO 2010/141358 A2 | 12/2010 |

OTHER PUBLICATIONS

I Docks, Old-Time Computer Customer Design Hardware, sales brochure, www.oldtimecomputer.com, 5 pgs.
iGrip, ShopCrackBerry, Charging Dock to BlackBerry torch 9810, Torch 9800, sales brochure, www.crackberry.com, 3 pgs.

* cited by examiner

*Primary Examiner* — Ramon Barrera
(74) *Attorney, Agent, or Firm* — Harrington & Smith (57) ABSTRACT

An apparatus including a support configured to receive a portable electronic device including a door and a first electrical connector; and a member, moveable relative to the support and configured to provide force to the door to open the door and expose the first electrical connector, the apparatus defining a cavity configured to receive the opened door.

19 Claims, 8 Drawing Sheets

APPARATUS FOR ELECTRICALLY CONNECTING TO A PORTABLE ELECTRONIC DEVICE

TECHNOLOGICAL FIELD

Embodiments of the present invention relate to an apparatus for electrically connecting to a portable electronic device. In particular, they relate to an apparatus for electrically connecting to a mobile cellular telephone.

BACKGROUND

Portable electronic devices, such as mobile cellular telephones, may be received by an apparatus that not only supports the portable electronic device but also electrically connects to the portable electronic device. Such apparatus are usually referred to as 'docking stations', 'docks' or a 'port replicator'.

Portable electronic devices may include a door that covers the electrical connector of the portable electronic device. In order to connect the portable electronic device to the apparatus, a user first opens the door with their fingers to expose the electrical connector and then connects the electrical connector to the electrical connector of the apparatus. However, such doors are relatively small and a user may find it inconvenient, or may struggle to open the door to expose the electrical connector of the portable electronic device.

Therefore, it would be desirable to provide an alternative apparatus.

BRIEF SUMMARY

According to various, but not necessarily all, embodiments of the invention there is provided an apparatus comprising: a support configured to receive a portable electronic device, the portable electronic device including a door and a first electrical connector; and a member, moveable relative to the support and configured to provide force to the door to open the door and expose the first electrical connector, the apparatus defining a cavity configured to receive the opened door.

The support may define a cavity configured to receive the portable electronic device therein.

The apparatus may further comprise a second electrical connector configured to connect to the first electrical connector of the portable electronic device.

The door of the portable electronic device may comprise metal, and the apparatus may further comprise a magnet configured to attract the metal of the door and retain the opened door in the cavity.

The apparatus may further comprise a guide, moveable relative to the support and configured to guide a portable electronic device when being received by the support. The guide may comprise the member.

The guide may define the cavity configured to receive the opened door.

The member may be defined by a protrusion on the guide.

The guide may be coupled to the support via a resiliently biased member.

The apparatus may be a docking station for the portable electronic device.

According to various, but not necessarily all, embodiments of the invention there is provided a method comprising: forming an apparatus including:
providing a support configured to receive a portable electronic device including a door and a first electrical connector; and providing a member, moveable relative to the support and configured to provide force to the door to open the door and expose the first electrical connector, the apparatus defining a cavity configured to receive the opened door.

The support may define a cavity configured to receive the portable electronic device therein.

The method may further comprise providing a second electrical connector configured to connect to the first electrical connector of the portable electronic device.

The door of the portable electronic device may comprise metal, and the method may further comprise providing a magnet configured to retain the opened door in the cavity.

The method may further comprise providing a guide, moveable relative to the support and configured to guide a portable electronic device when being received by the support. The guide may comprise the member.

The guide may define the cavity configured to receive the opened door.

The member may be defined by a protrusion on the guide.

The guide may be coupled to the support via a resiliently biased member.

The apparatus may be a docking station for the portable electronic device.

BRIEF DESCRIPTION

For a better understanding of various examples of embodiments of the present invention reference will now be made by way of example only to the accompanying drawings in which.

DETAILED DESCRIPTION

In the following description and figures, the wording 'connect' and 'couple' and their derivatives mean operationally connected or coupled. It should be appreciated that any number or combination of intervening components can exist (including no intervening components).

FIGS. 1, 2, 3, 4 and 5 illustrate an apparatus 10 comprising: a support 14 configured to receive a portable electronic device 12, the portable electronic device 12 including a door 26 and a first electrical connector 24; and a member 16, moveable relative to the support 14 and configured to provide force to the door 26 to open the door 26 and expose the first electrical connector 24, the apparatus 10 defining a cavity configured to receive the opened door 26.

Figure 1:
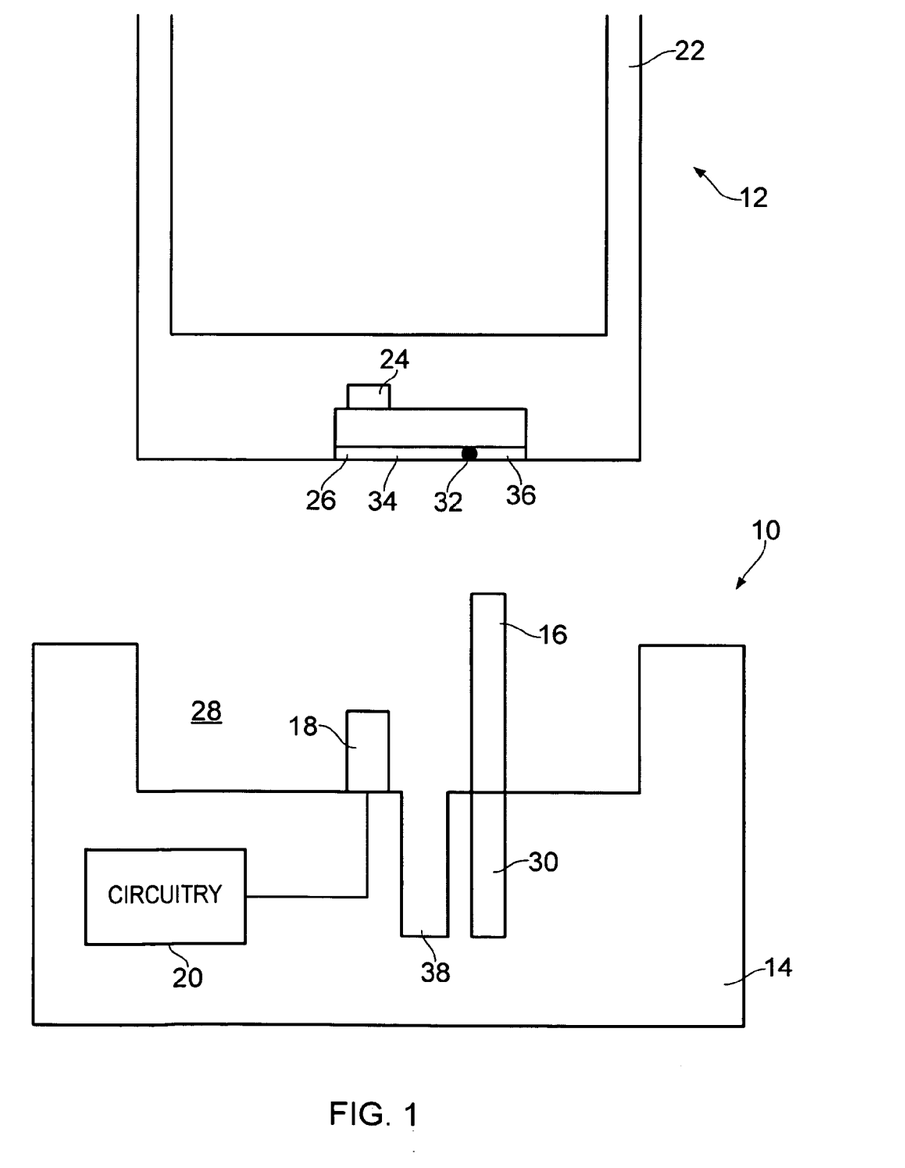
FIG. 1 illustrates a schematic cross sectional side view of an apparatus according to various embodiments of the invention and a portable electronic device.

In more detail, FIG. 1 illustrates a schematic cross sectional side view of an apparatus 10 according to various embodiments of the invention and a portable electronic device 12. The apparatus 10 may be referred to as a 'docking station', a 'dock' or a 'port replicator' or may be a module for such devices. As used here, 'module' refers to a unit or apparatus that excludes certain parts or components that would be added by an end manufacturer or a user. The apparatus 10 includes a support 14, a member 16, an electrical connector 18 and circuitry 20.

The portable electronic device 12 may be any hand-portable electronic device. For example, the portable electronic device 12 may be a mobile cellular telephone, a tablet computer, a laptop computer, a personal digital assistant, a hand held computer, a portable multimedia device (such as a music player, a video player, a game console and so on) or a module for such devices. The portable electronic device 12 includes a housing 22, an electrical connector 24 and a door 26.

It should be appreciated that the portable electronic device 12 may include additional parts in different embodiments. For example, the portable electronic device 12 may additionally include any combination of one or more processors, one or more memories, one or more displays, one or more user input devices, one or more audio input devices, one or more audio output devices, one or more transceivers and one or more antennas.

The support 14 is configured to receive and support the portable electronic device 12. The support 14 defines a cavity 28 in which the portable electronic device 10 may be placed and thereby supported by the surface of the cavity 28. In this embodiment, the cavity 28 is dimensioned and shaped to receive only a portion of the portable electronic device 12. In other embodiments (such as the one illustrated in FIGS. 4 and 5), the cavity 28 may be dimensioned and shaped to receive the whole of the portable electronic device 12 therein. The support 14 also forms a housing for the apparatus 10 and houses at least some of the components of the apparatus 10 (such as the circuitry 20).

The member 16 is configured to provide force to the door 26 of the portable electronic device 12 to open the door 26 and thereby expose the electrical connector 24. The member 16 has a variety of different forms in different embodiments, but is generally configured so that the member 16 opens the door 26 prior to the electrical connectors 18, 24 being brought into a connected or mated configuration.

In this embodiment, the member 16 is elongate and extends vertically from the bottom surface of the cavity 28. The support 14 defines a further cavity 30 and the member 16 is moveable in and out of the cavity 30. In some embodiments, the member 16 may be coupled to the support 14 via a resiliently biased member (such as a spring) which provides a force to position the member 16 in the configuration illustrated in FIG. 1 (that is, so that the member 16 is positioned outside of the cavity 30). The resiliently biased member is configured such that the force required to insert the portable electronic device 12 into the cavity 28 is greater than force required to open the door 26.

In other embodiments, the member 16 may not be coupled to the support 14 via a resiliently biased member, but may instead be in frictional contact with the surface of the cavity 38 and therefore require force to be moved in and out of the cavity 38. In these embodiments, the frictional contact between the member 16 and the surface of the cavity 38 is selected so that the force required to insert the portable electronic device 12 into the cavity 28 is greater than force required to open the door 26.

The door 26 is coupled to the housing 22 of the portable electronic device 12 via a pivot 32. A first portion 34 of the door 26 is positioned to the left of the pivot 32 and a second portion 36 is positioned to the right of the pivot 32 (the first portion 34 is longer than the second portion 36). The door 26 is configured so that it may pivot anti-clockwise about the pivot 32 through ninety degrees and thereby expose the electrical connector 24.

Figure 2:
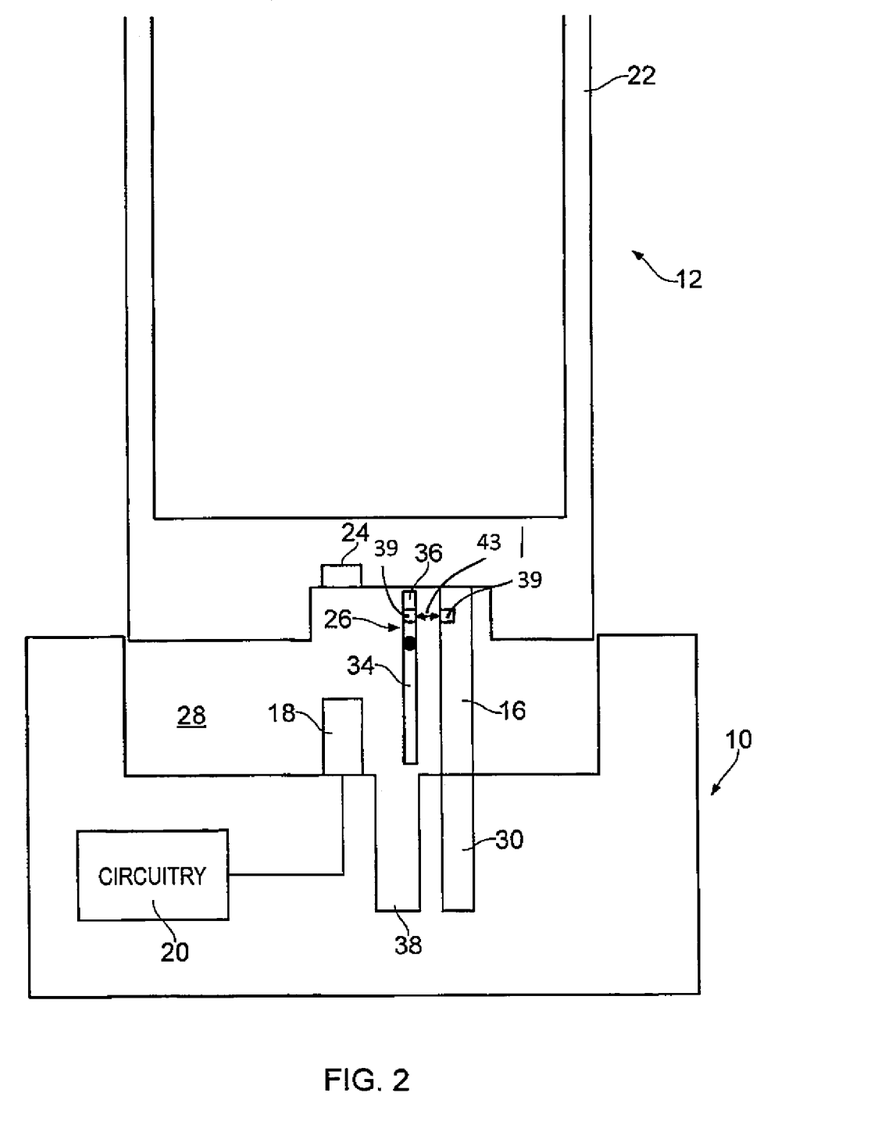
FIG. 2 illustrates the apparatus and the portable electronic device of FIG. 1 whereby the portable electronic device is being brought into a mated configuration with the apparatus.

The member 16 is arranged so that as the portable electronic device 12 is brought into a connected configuration with the apparatus 10, the member 16 provides force to the second portion 36 of the door 26 to rotate the door 26 anti-clockwise about the pivot 32 and thereby open the door 26 and expose the electrical connector 24 (as illustrated in FIG. 2). In some embodiments, the force is provided through physical contact between the member 16 and the second portion 36 of the door 26. In other embodiments, the force may not be caused by physical contact. For example, where the member 16 and the second portion 36 include magnets 39 having opposite polarity, the force may be due to magnetic repulsion 43 between the member 16 and the second portion 36.

Figure 3:
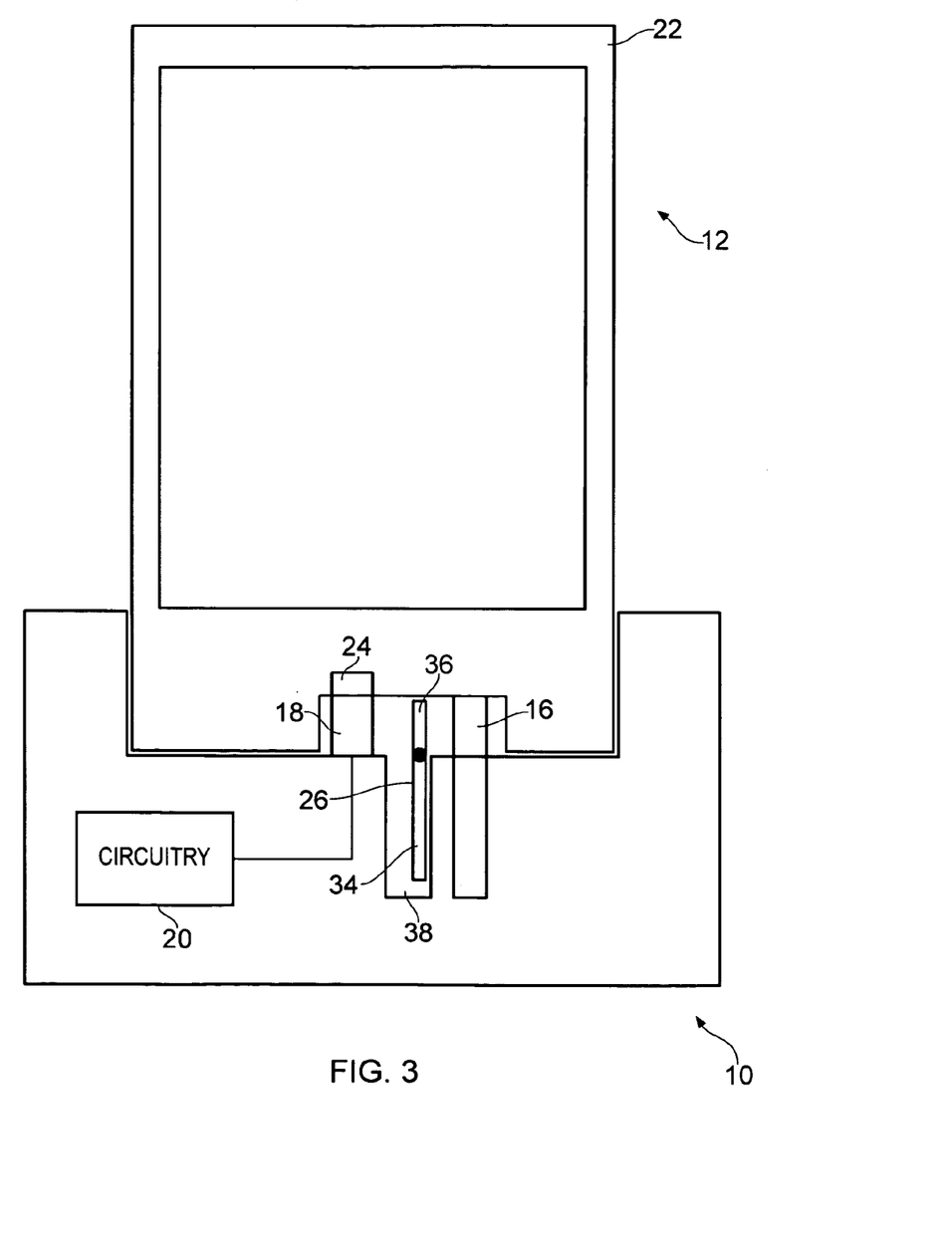
FIG. 3 illustrates the apparatus and the portable electronic device of FIGS. 1 and 2 whereby the portable electronic device is in a mated configuration with the apparatus.

The support 14 also defines a cavity 38 that is configured to receive the opened door 26. In particular, the cavity 38 is dimensioned and shaped so that the opened door 26 may be positioned at least partially within the cavity 38. As illustrated in FIG. 3, when the apparatus 10 and the portable electronic device 12 are in a connected configuration, the first portion 34 of the door 26 is positioned within the cavity 38.

The electrical connector 18 of the apparatus 10 may be any suitable connector and may be, for example, a Universal Serial Bus (USB) connector or a High Definition Multimedia Interface (HDMI) connector. The electrical connector 18 is positioned within the cavity 28 so that as the portable electronic device 10 is received within the cavity 28, the electrical connector 18 of the apparatus 10 may connect with the corresponding electrical connector 24 of the portable electronic device 12.

The circuitry 20 is configured to provide electrical signals to, and/or receive electrical signals from the portable electronic device 12 via the electrical connector 18. The circuitry 20 may take a variety of different forms in different embodiments. For example, the circuitry 20 may include charging circuitry for charging the portable electronic device 12. By way of another example, the circuitry 20 may include circuitry for receiving audio signals from the portable electronic device 12 and for controlling one or more audio output devices (which may or may not be part of the apparatus 10) to provide acoustic waves. By way of a further example, the circuitry 20 may include circuitry for receiving image signals from the portable electronic device 12 and for controlling a display (which may or may not be part of the apparatus 10) to display images.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause the apparatus to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for an apparatus.

Various embodiments of the invention provide an advantage in that the apparatus 10 may be relatively simple to use since a portable electronic device 12 may be connected to the apparatus 10 without requiring a user to first open the door 26 to expose the electrical connector 24 of the portable electronic device 12. As described in the preceding paragraphs, as the portable electronic device 12 is brought into a connected configuration with the apparatus 10, the member 16 provides a force to the door 26 to open the door 26 and expose the electrical connector 24. Since the member 16 is moveable relative to the support 14, the member 16 does not obstruct the subsequent connection between the electrical connector 18 and the electrical connector 24. Furthermore, since the support 14 includes a cavity 38 for receiving the opened door 26, the opened door 26 also does not obstruct the subsequent connection between the electrical connector 18 and the electrical connector 24. Consequently, various embodiments advantageously provide an apparatus whereby a portable electronic device may be connected to the apparatus by a user performing a single movement that inserts the portable electronic device into connection with the apparatus. Furthermore, the single movement performed by the user may only require a single hand in various embodiments.

Various embodiments of the invention also provide an advantage in that the apparatus 10 may not require any user manipulation after the portable electronic device 12 is removed from the apparatus 10 because the resiliently biased member may return the member 16 to the position illustrated in FIG. 1 and thereby place the apparatus 10 in a configuration for receiving a portable electronic device.

Figure 4:
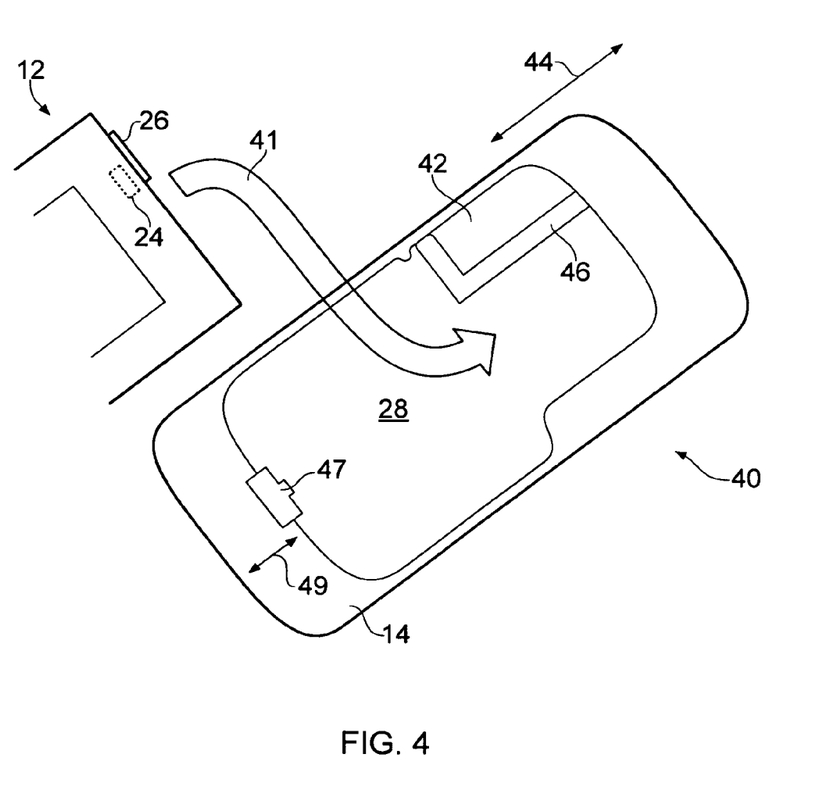
FIG. 4 illustrates a perspective view of another apparatus according to various embodiments of the invention.

FIG. 4 illustrates a perspective view of another apparatus 40 according to various embodiments of the invention. The apparatus 40 is similar to the apparatus 10 illustrated in FIGS. 1 to 3 and where the features are similar, the same reference numerals are used.

The apparatus 40 differs from the apparatus 10 in that the apparatus 40 includes a support 14 that defines a cavity 28 that is arranged to receive the whole of a portable electronic device 12 therein. The portable electronic device 12 may be inserted into the apparatus 40 as indicated by arrow 41 so that the end of the portable electronic device 12 that comprises the door 26 is inserted first into the cavity 28.

The apparatus 40 also differs from the apparatus 10 in that it comprises a guide 42 that is moveable relative to the support 14 as indicated by the arrows with reference numeral 44 in the figure. The guide 42 is coupled to the support 14 via a resiliently biased member (such as a spring) that biases the guide 42 towards the left (as illustrated in FIG. 4) and the position illustrated in FIG. 4. The guide 42 includes a cavity 46 for receiving the portable electronic device 12 therein and is configured to guide the portable electronic device 12 as it is being inserted into the support 14 so that the electrical connector 24 of the portable electronic device 12 connects to the electrical connector 18 of the apparatus 40.

Additionally, the apparatus 40 differs from the apparatus 10 in that it includes a lock 47 for locking the portable electronic device 12 in the cavity 28. The lock 47 is positioned at the opposite end of the cavity 28 from the guide 42 and is moveable relative to the support 14 as indicated by the arrows with reference numeral 49. The lock 47 is resiliently biased to move towards the right (as illustrated in FIG. 4) and thereby partially cover the cavity 28 and prevent the portable electronic device 12 from accidentally falling out of the apparatus 40. In order to remove the portable electronic device 12 from the apparatus 40, a user may move the lock 47 to the left (as illustrated in FIG. 4) and then pull the portable electronic device 12 out of the cavity 28.

Figure 5:
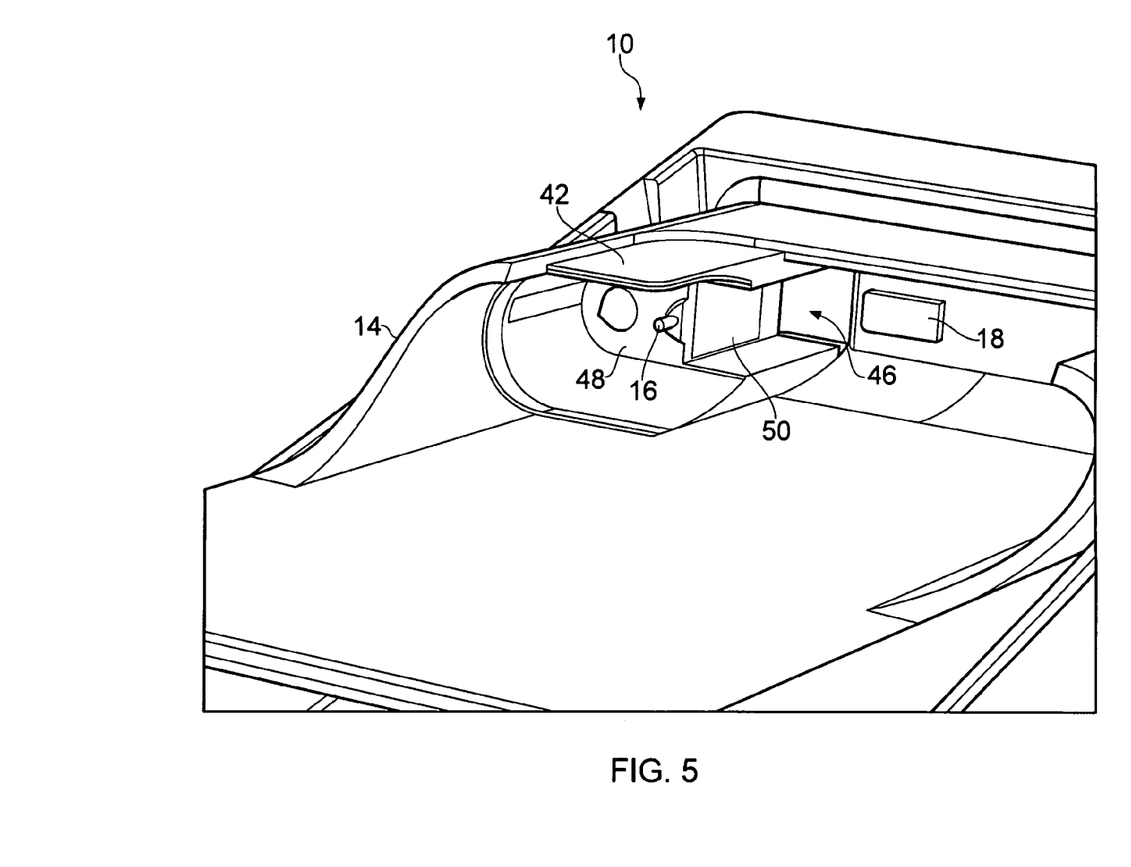
FIG. 5 illustrates another perspective view of the apparatus illustrated in FIG. 4.

With reference to FIGS. 4 and 5, the guide 42 includes a surface 48 that defines a protrusion that extends out of the surface 48 and forms the member 16 in this embodiment. As described above with reference to FIGS. 1 to 3, the member 16 is arranged so that as the portable electronic device 12 is inserted into the cavity 28, the member 16 provides force to the door 26 of the portable electronic device 12 to open the door 26 and expose the electrical connector 24 of the portable electronic device 12.

The guide 42 includes a magnet 50 for providing a magnetic attractive force to the door 26 of the portable electronic device 12 (where the door 26 includes metal). The magnet 50 is configured to retain the door 26 in the cavity 46 so that the door 26 does not obstruct the electrical connector 24 from connecting to the electrical connector 18. It will be appreciated that as the portable electronic device 12 is inserted into the cavity 28, the member 16 causes the door 26 to rotate so that it extends from the end of the portable electronic device 12 and the magnet 50 provides an attractive force to the door 26 to retain the door 26 on the magnet 50.

Various embodiments of the invention provide an advantage in that the magnet 50 may help to ensure that the opened door 26 does not obstruct the connection between the electrical connectors 18, 24 when the portable electronic device 10 is brought into a connected configuration with the apparatus 40.

Figure 6:
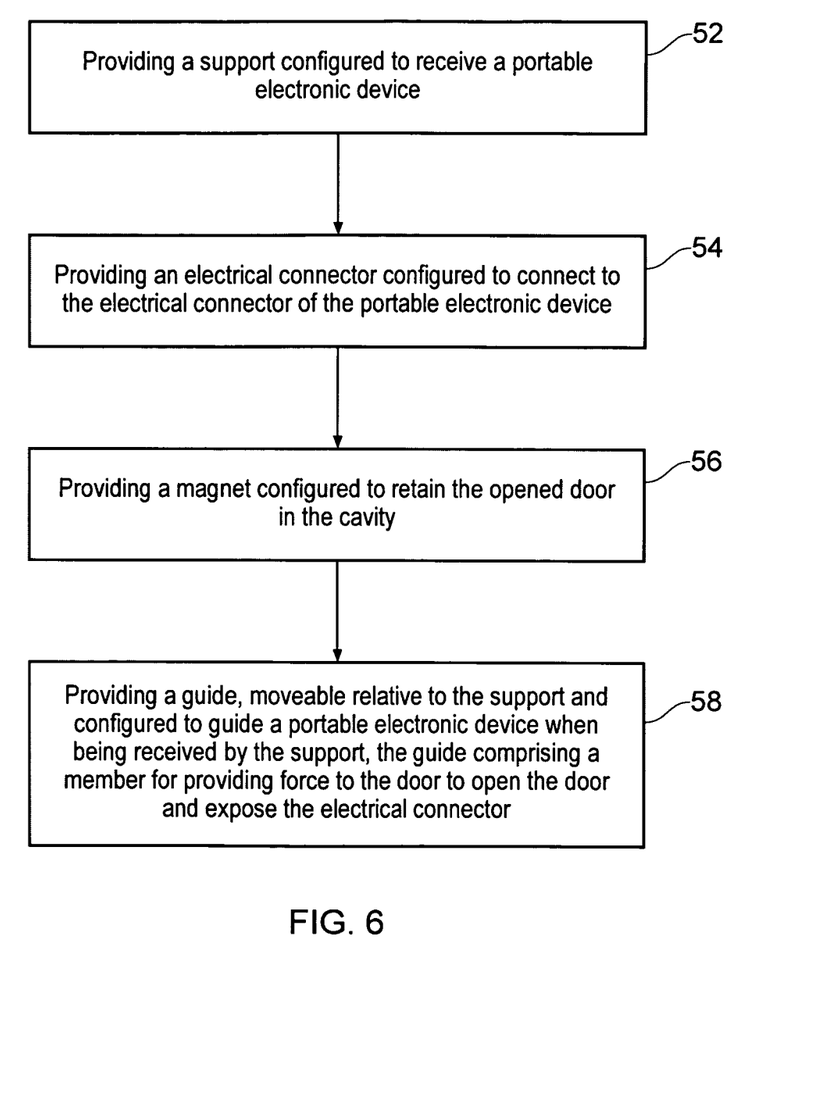
FIG. 6 illustrates a flow diagram of a method of forming an apparatus according to various embodiments of the invention.

FIG. 6 illustrates a flow diagram of a method of forming an apparatus 10, 40 according to various embodiments of the invention.

At block 52, the method includes providing a support 14 that is configured to receive a portable electronic device 12. For example, the support 14 may be manufactured through injection moulding.

At block 54, the method includes providing the apparatus 10, 40 with an electrical connector 18 that is configured to connect to an electrical connector of a portable electronic device. For example, a Universal Serial Bus (USB) connector may be inserted into an aperture in the support 14 and adhered to the support 14.

At block 56, the method optionally includes providing a magnet 50 that is configured to retain the opened door 26 in a cavity of the apparatus 10, 40. For example, the magnet 50 may be adhered to a recess formed in the support 14.

At block 58, the method includes providing a guide 42 that is moveable relative to the support 14 and is configured to guide a portable electronic device when being received by the support 14. The guide 42 comprises a member 16 for providing force to a door 26 of the portable electronic device to open the door 26 and expose the electrical connector 24. The guide 42 may then be coupled to the support 14 via a resiliently biased member such as a spring.

In other embodiments, block 58 may not include providing the guide 42, but may instead comprise providing the member 16. For example, block 58 may include providing the member 16 to the apparatus 10 illustrated in FIGS. 1 to 3 and coupling the member 16 to the support 14 via a resiliently biased member.

The blocks illustrated in the FIG. 6 may represent steps in a method and/or sections of code in a computer program. For example, a processor may execute the computer program to control machinery to perform the method illustrated in FIG. 6. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example, the guide 42 may be replaced with a gear mechanism (as illustrated in FIG. 7) or a lever mechanism (as illustrated in FIG. 8) for opening the door 26 of the portable electronic device.

Figure 7:
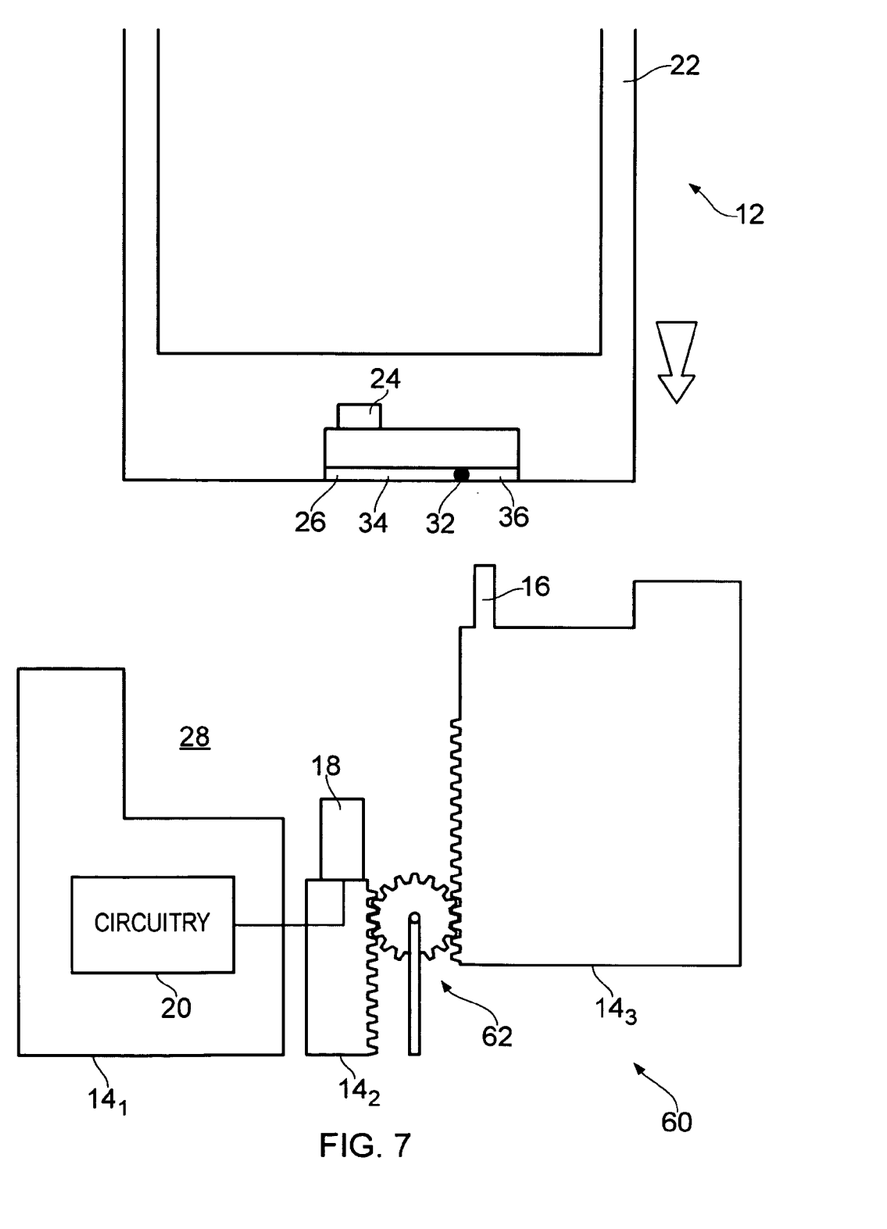
FIG. 7 illustrates a schematic cross sectional side view of a further apparatus according to various embodiments of the invention and a portable electronic device.
Figure 8:
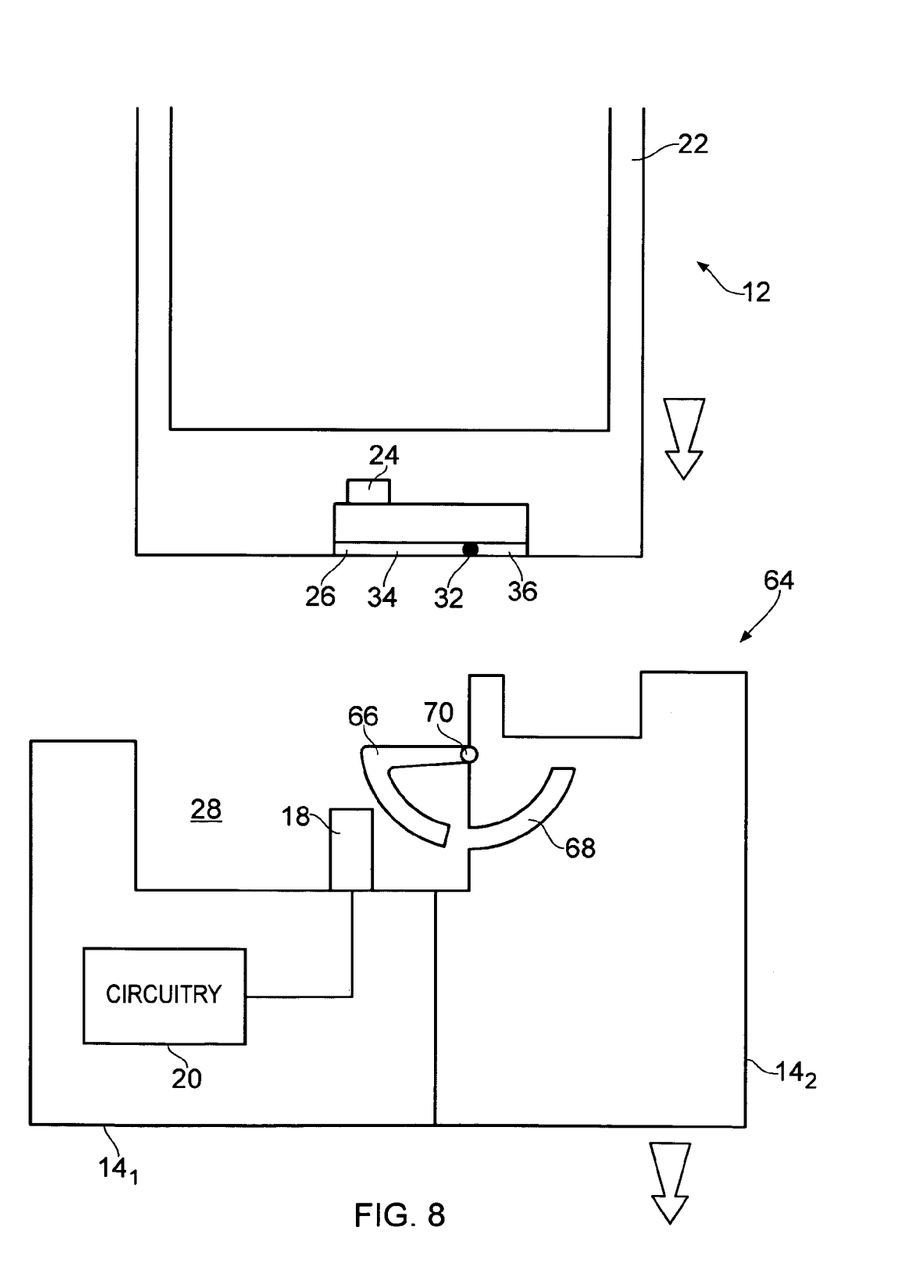
FIG. 8 illustrates a schematic cross sectional side view of another apparatus according to various embodiments of the invention and a portable electronic device.

FIG. 7 illustrates a schematic cross sectional side view of a further apparatus 60 according to various embodiments of the invention and a portable electronic device 12. The apparatus 60 is similar to the apparatus 10 illustrated in FIGS. 1 to 3 and where the features are similar, the same reference numerals are used.

The apparatus 60 differs from the apparatus 10 in that the support 14 includes a first support portion $14_1$, a second support portion $14_2$ and a third support portion $14_3$. The first support portion $14_1$ includes the circuitry 20, the second support portion $14_2$ includes the electrical connector 18 and the third support portion $14_3$ defines the member 16 (which is a protrusion on an upper surface of the third support portion $14_3$).

The apparatus 60 also includes a gear 62 that is positioned between the second support portion $14_2$ and the third support portion $14_3$. The second support portion $14_2$ and the third support portion $14_3$ include a plurality of teeth that are configured to co-operate with the gear 62. The second and third support portions $14_2$, $14_3$ are moveable relative to one another via the gear 62. The gear 62 may include a tension spring that is configured to bias the third support portion $14_3$ upwards (as illustrated in FIG. 7) and the second support portion $14_2$ downwards (as illustrated in FIG. 7).

In operation, the portable electronic device 12 may be moved downwards (as illustrated in FIG. 7) and the door 26 is opened by the member 16 as described above. As the portable electronic device 12 is moved further downwards, the portable electronic device 12 pushes the third support portion $14_3$ downwards and hence causes the second support portion $14_2$ to move upwards and thus connect the electrical connectors 18 and 24.

FIG. 8 illustrates a schematic cross sectional side view of another apparatus 64 according to various embodiments of the invention and a portable electronic device 12. The apparatus 64 is similar to the apparatus 10 illustrated in FIGS. 1 to 3 and where the features are similar, the same reference numerals are used.

The apparatus 64 differs from the apparatus 10 in that the support 14 includes a first support portion $14_1$ and a second support portion $14_2$. The first support portion $14_1$ includes the circuitry 20 and the electrical connector 18. The second support portion $14_2$ defines the member 16 (which is a protrusion on an upper surface of the third support portion $14_3$). The first support portion $14_1$ and the second support portion $14_2$ are moveable relative to one another and may include a spring that is configured to bias the second support portion $14_2$ upwards (as illustrated in FIG. 8) relative to the first support portion $14_1$.

The second support portion $14_2$ includes a lever 66 and defines a correspondingly shaped cavity 68. The lever 66 may include a tension spring that is configured to bias the lever 66 to the position illustrated in FIG. 8. The lever 66 is configured to at least partially cover the electrical connector 66 (as illustrated in FIG. 8). The lever 66 is also configured to pivot around the pivot point 70 and enter the cavity 68 and thereby expose the electrical connector 18.

In operation, the portable electronic device 12 may be moved downwards (as illustrated in FIG. 8) and the door 26 is opened by the member 16 as described above. As the portable electronic device 12 is moved further downwards, the opened door 26 pushes the lever 66 into the cavity 68 and thereby enables the electrical connectors 18 and 24 to connect.

In some embodiments, the apparatus 10, 40 may include one or more motors and the circuitry 20 may be configured to control the one or more motors to automatically connect and disconnect the portable electronic device 12 and the apparatus 10. In this embodiment, a user may simply place the portable electronic device 12 in the cavity 28 and a sensor then detects the presence of the portable electronic device 12 in the cavity 28. In response to the detection, the circuitry 20 controls the one or more motors to move the portable electronic device (for example, via one or more rollers) into a connected configuration with the apparatus 10, 40. In order to eject the portable electronic device 12 from the apparatus 10, 40, a user may press a button on the apparatus 10, 40 and the circuitry 20 then controls the one or more motors to eject the portable electronic device 12.

In some embodiments, the support 14 may not include the cavity 28 for receiving the portable electronic device 12. For example, the support 14 may have a relatively flat surface for receiving the portable electronic device that only includes the electrical connector 18 and the cavity 38 for receiving the door 26.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   a support configured to receive a portable electronic device, the portable electronic device including a door and a first electrical connector; and
   a member, moveable relative to the support and configured to provide force to the door to open the door and expose the first electrical connector, the apparatus defining a cavity configured to receive the opened door;
   wherein the member provides a force to open the door without causing physical contact between the member and the door.

2. An apparatus as claimed in claim 1, wherein the support defines a cavity configured to receive the portable electronic device therein.

3. An apparatus as claimed in claim 1, further comprising a second electrical connector configured to connect to the first electrical connector of the portable electronic device.

4. An apparatus as claimed in claim 1, wherein the door of the portable electronic device comprises metal, and the apparatus further comprises a magnet configured to attract the metal of the door and retain the opened door in the cavity.

5. An apparatus as claimed in claim 1, further comprising a guide, moveable relative to the support and configured to guide a portable electronic device when being received by the support, the guide comprising the member.

6. An apparatus as claimed in claim 5, wherein the guide defines the cavity configured to receive the opened door.

7. An apparatus as claimed in claim 5, wherein the member is defined by a protrusion on the guide.

8. An apparatus as claimed in claim 5, wherein the guide is coupled to the support via a resiliently biased member.

9. An apparatus as claimed in claim 1, wherein the apparatus is a docking station for the portable electronic device.

10. A method comprising:
forming an apparatus including:
providing a support configured to receive a portable electronic device including a door and a first electrical connector; and
providing a member, moveable relative to the support and configured to provide force to the door to open the door and expose the first electrical connector, the apparatus defining a cavity configured to receive the opened door;
wherein the member provides a force to open the door without causing physical contact between the member and the door.

11. A method as claimed in claim 10, wherein the support defines a cavity configured to receive the portable electronic device therein.

12. A method as claimed in claim 10, further comprising providing a second electrical connector configured to connect to the first electrical connector of the portable electronic device.

13. A method as claimed in claim 10, wherein the door of the portable electronic device comprises metal, and the method further comprises providing a magnet configured to retain the opened door in the cavity.

14. A method as claimed in claim 10, further comprising providing a guide, moveable relative to the support and configured to guide a portable electronic device when being received by the support, the guide comprising the member.

15. A method as claimed in claim 14, wherein the guide defines the cavity configured to receive the opened door.

16. A method as claimed in claim 14, wherein the member is defined by a protrusion on the guide.

17. A method as claimed in claim 14, wherein the guide is coupled to the support via a resiliently biased member.

18. A method as claimed in claim 10, wherein the apparatus is a docking station for the portable electronic device.

19. An apparatus comprising:
a support configured to receive a portable electronic device, the portable electronic device including a door and a first electrical connector; and
a member, moveable relative to the support and configured to provide force to the door to open the door and expose the first electrical connector, the apparatus defining a cavity configured to receive the opened door;
wherein the door of the portable electronic device comprises metal, and the apparatus further comprises a magnet configured to attract the metal of the door and retain the opened door in the cavity.

* * * * *